US009242437B2

(12) United States Patent
Goubard et al.

(10) Patent No.: US 9,242,437 B2
(45) Date of Patent: Jan. 26, 2016

(54) HMPSA FOR DEBONDABLE SELF-ADHESIVE LABEL

(75) Inventors: David Goubard, Compiegne (FR); Nicolas Sajot, Clairoix (FR)

(73) Assignee: BOSTIK S.A., La Plaine Saint Denis (FR)

( * ) Notice: Subject to any disclaimer, the term of this patent is extended or adjusted under 35 U.S.C. 154(b) by 481 days.

(21) Appl. No.: 13/105,740

(22) Filed: May 11, 2011

(65) Prior Publication Data

US 2011/0281045 A1 Nov. 17, 2011

(30) Foreign Application Priority Data

May 11, 2010 (FR) ..................................... 10 02001

(51) Int. Cl.
*C09J 153/02* (2006.01)
*B32B 27/08* (2006.01)
*B32B 7/12* (2006.01)
*C09J 7/02* (2006.01)
*C09J 7/04* (2006.01)
*C08K 5/00* (2006.01)
*C08K 5/09* (2006.01)
*C08K 5/3445* (2006.01)
*C08L 77/06* (2006.01)

(52) U.S. Cl.
CPC . *B32B 27/08* (2013.01); *B32B 7/12* (2013.01); *C09J 7/0246* (2013.01); *C09J 7/045* (2013.01); *C09J 153/02* (2013.01); *C08K 5/0008* (2013.01); *C08K 5/09* (2013.01); *C08K 5/3445* (2013.01); *C08L 77/06* (2013.01); *C09J 2205/102* (2013.01); *C09J 2400/283* (2013.01); *C09J 2453/00* (2013.01); *Y10T 428/1321* (2015.01); *Y10T 428/1352* (2015.01); *Y10T 428/1452* (2015.01); *Y10T 428/24802* (2015.01); *Y10T 428/24934* (2015.01)

(58) Field of Classification Search
CPC .. C09J 7/0221; C09J 153/02; C09J 2205/102; C09J 2453/00; C08K 5/3445
See application file for complete search history.

(56) References Cited

U.S. PATENT DOCUMENTS

| | | | | |
|---|---|---|---|---|
| 6,576,712 | B2 * | 6/2003 | Feldstein et al. | 525/326.9 |
| 8,062,707 | B2 * | 11/2011 | Fukuda et al. | 427/255.23 |
| 8,536,281 | B2 * | 9/2013 | Montarnal | C08G 69/28 525/420 |
| 8,715,797 | B2 * | 5/2014 | Fouquay | C09J 153/02 241/19 |
| 8,916,142 | B2 * | 12/2014 | Grimaldi | A61K 8/84 424/400 |
| 2004/0220308 | A1 | 11/2004 | Paul et al. | |
| 2009/0051272 | A1 * | 2/2009 | Fukuda et al. | 313/504 |
| 2010/0135940 | A1 * | 6/2010 | Grimaldi et al. | 424/62 |
| 2010/0193127 | A1 * | 8/2010 | Fouquay et al. | 156/344 |
| 2011/0168329 | A1 * | 7/2011 | Sajot et al. | 156/330.9 |
| 2012/0029139 | A1 * | 2/2012 | Dufaure et al. | 524/533 |

FOREIGN PATENT DOCUMENTS

| | | | |
|---|---|---|---|
| FR | 2 918 069 | 1/2009 | |
| WO | WO 2008029065 A2 * | 3/2008 | |
| WO | 2008/110685 | 9/2008 | |
| WO | WO 2009016285 A1 * | 2/2009 | |
| WO | WO 2009141558 A2 * | 11/2009 | C08G 69/26 |
| WO | WO 2009150328 A2 * | 12/2009 | |
| WO | WO 2010086569 A1 * | 8/2010 | |

* cited by examiner

*Primary Examiner* — Scott R Walshon
(74) *Attorney, Agent, or Firm* — Hunton & Williams LLP

(57) ABSTRACT

A hot-melt pressure-sensitive adhesive (HMPSA) composition comprising (a) 25 to 50% of one or more styrene block copolymers SBS, SIS, SIBS, SEBS or SEPS; (b) 35 to 75% of one or more compatible tackifying resins that are liquid or have a softening temperature below 150° C.; and (c) 1 to 20% of one or more supramolecular polymers obtained by reaction between 1-(2-aminoethyl)-2-imidazolidone and a fatty acid composition comprising 51 to 100% of one or more dimers and/or trimers of fatty acids and 0 to 49% of one or more monomers of fatty acids. A multilayer system including the HMPSA, an adjacent printable support layer, made of paper or a polymer film, and a protective layer adjacent is also provided. The multilayer system may be used in a self-adhesive label.

16 Claims, No Drawings

HMPSA FOR DEBONDABLE SELF-ADHESIVE LABEL

CROSS-REFERENCE TO RELATED APPLICATIONS

This application is the U.S. Utility filing, which claims priority to French Application No. 10.02001 filed May 11, 2010, the disclosures of which is hereby incorporated in its entirety by reference.

The subject of the present invention is a hot-melt pressure-sensitive adhesive composition suitable for bonding self-adhesive labels that can be debonded during a process for recycling the articles to which they have been fastened (such as packages and/or containers, for example glass bottles). The invention also relates to a multilayer system comprising a layer consisting of said composition, to a self-adhesive label, to the corresponding labelled article and to a process for recycling said article, which includes a step of debonding the label.

BACKGROUND OF THE INVENTION

Many labelled packages and/or containers are subjected, after removal of their contents, to cleaning (or recycling) treatments either for the purpose of reusing them or, after destruction, for the purpose of recovering their constituent material. Such treatments often require the label to be completely separated from the article to which it is fastened, without leaving adhesive residues on the surface of said article, so as to make the recycling process easier.

These recycling processes, such as the one used for cleaning spent glass bottles, generally include a step of immersing the article to be cleaned in basic aqueous compositions maintained at temperatures between 60 and 100° C. The purpose of such a step is also the debonding of the label fastened to the article and its separation therefrom.

DETAILED DESCRIPTION

Pressure-sensitive adhesives or PSAs (also called contact adhesives) are substances giving the support coated therewith tack at room temperature, which allows its instantaneous adhesion to a substrate under the effect of brief slight pressure. PSAs are widely used for the manufacture of self-adhesive labels, which are fastened to articles for the purpose of presenting information (such as a barcode, description, price) and/or for decorative purposes.

PSAs are generally applied by continuous coating processes to the entire surface of a printable support layer of large dimensions, consisting of paper or a film of polymer material having one or more layers. The adhesive layer that covers the printable support layer (generally the side opposite the printable side) is itself covered with a protective layer (often called a "release liner"), consisting for example of a siliconized film. The multilayer system obtained is generally packaged by being wound up in the form of large reels up to 2 m in width and 1 m in diameter, which can be stored and transported.

This multilayer system can be subsequently converted into self-adhesive labels that can be applied by the end user by means of conversion processes that include the printing of desired decorative elements and/or information on the printable side of the support layer, followed by cutting to the desired shape and dimensions. The protective layer may be easily removed without modifying the adhesive layer that remains fastened to the printable support layer. After separation from its protective layer, the label is applied at a temperature close to the ambient temperature to the article to be coated, either manually or with the use of labellers on automated packaging lines.

PSAs, because of their high room-temperature tack, make it possible for the label to be rapidly bonded to the article to be coated (for example bottles), suitable for obtaining high industrial production rates.

U.S. Pat. No. 3,763,117 describes an acrylate-based PSA having good adhesive properties, which allows easy separation when hot using a basic aqueous solution.

U.S. Pat. No. 5,385,965 also describes a PSA making it possible, after coating on a paper support or film of a polymer material, to obtain a label that can be detached from the substrate through the action of a hot alkaline solution. This PSA takes the form of an aqueous emulsion of an acrylate-based copolymer or of a styrene-butadiene copolymer. The solids content of this emulsion does not exceed 70%, so that coating this PSA on the support layer is complicated by the need for an emulsion drying step. In addition, such adhesives have the drawback of passing partially into solution or into suspension in the aqueous compositions used for recycling labelled bottles, thereby imposing on industrial installations constraints in the reprocessing of these compositions before discharge into the environment.

International patent applications WO 2008/110685 and WO 2009/016285 teach hot-melt pressure-sensitive adhesive compositions comprising a styrene block copolymer, a tackifying resin and a fatty acid, the latter being in acid form or in the form of a metal salt.

These compositions make it possible, after being coated on a support layer, to obtain a self-adhesive label that may be permanently bonded to an article, such as for example a glass bottle, and which subsequently may also be rapidly and completely debonded during a step of immersing the labelled article in a basic aqueous solution at high temperature, the adhesive remaining essentially fastened to the label after separation thereof.

Hot-melt adhesives or hot melts (HMs) are substances that are solid at room temperature and contain neither water nor solvent. They are applied in the melt state and solidify upon being cooled, thus forming a joint for fastening the substrates to be assembled. These hot-melt adhesives usually take the form of compositions that comprise a thermoplastic polymer and optionally a tackifying resin and a plasticizer. Certain hot melts are formulated so as to give the support coated therewith a relatively hard and tack-free character. Other hot melts provide the support with a relatively soft and high-tack character. PSAs are widely used for the manufacture of self-adhesive labels—the corresponding adhesives are denoted by hot-melt pressure-sensitive adhesives or HMPSAs.

The object of the present invention is to propose, in particular, a novel HMPSA that provides an alternative response to the problem solved by the compositions of patent applications WO 2008/110685 and WO 2009/016285. It is in fact always desirable to elaborate on the prior art and provide self-adhesive label manufacturers with new solutions suitable for meeting the requirements of their customers and having, where appropriate, improved properties, for example as regards the debonding time or debonding rate.

The invention therefore firstly relates to a hot-melt pressure-sensitive adhesive (HMPSA) composition comprising:
a) 25 to 50% of one or more styrene block copolymers chosen from the group comprising SBS, SIS, SIBS, SEBS and SEPS;
b) 35 to 75% of one or more compatible tackifying resins which are liquid or have a softening temperature below 150° C.; and c) 1 to 20% of one or more supramolecular polymers obtained by reaction between:
1-(2-aminoethyl)-2-imidazolidone (also called Ureido DiEthylene TriAmine or UDETA):

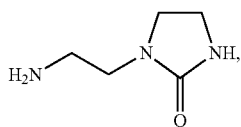

Formula (I)

and
a fatty acid composition comprising:
51 to 100% of one or more dimers of identical or different fatty acids and/or of one or more trimers of identical or different fatty acids; and
0 to 49% of one or more monomers of identical or different fatty acids.

Unless otherwise indicated, the percentages used in the present text to express the amounts correspond to weight/weight percentages.

The block copolymers that can be used in the HMPSA according to the invention have a weight-average molecular weight $M_w$, of generally between 60 kDa and 400 kDa and consist of blocks of various polymerized monomers. They have a triblock configuration of general formula:

$$A\text{-}B\text{-}A \quad (II)$$

in which:
A represents a non-elastomer styrene (or polystyrene) block; and
B represents an elastomeric block which may be:
polybutadiene: the block copolymer then has as structure: polystyrene-polybutadiene-polystyrene and is called SBS
polyisoprene: the block copolymer then has as structure: polystyrene-polyisoprene-polystyrene and is called SIS;
polyisoprene-polybutadiene: the block copolymer then has as structure: polystyrene-polyisoprene-polybutadiene-polystyrene and is called SIBS
completely or partly hydrogenated polyisoprene: the block copolymer then has as structure: polystyrene-poly(ethylenepropylene)-polystyrene and is called SEPS;
completely or partly hydrogenated polybutadiene: the block copolymer then has as structure: polystyrene-poly(ethylenebutylene)-polystyrene and is called SEBS. This SEBS copolymer may optionally have been chemically modified by maleic anhydride.

These styrene triblock copolymers may be obtained according to methods known per se and are commercially available. The processes for obtaining these commercial products also generally result in the formation of variable amounts of diblock compounds of formula A-B. Thus, in the context of the present text, the terms SBS, SIS, SIBS, SEBS and SEPS denote in fact mixtures of triblocks and diblocks. The amount of diblocks may vary without any inconvenience from 0 to 90% on the basis of the total weight of styrene copolymers within the composition according to the invention. Apart from the linear structure of formula (II), the styrene triblock copolymers that can be used in the HMPSA according to the invention may also have a radial structure.

Of course, the styrene block copolymer or copolymers included in the HMPSA according to the invention, which are chosen from the group comprising SBS, SIS, SIBS, SEBS and SEPS, may belong to one or several of these five families of copolymers.

The amount of styrene block may itself vary widely, such as for example from 15% to 50% (on the basis of the total weight of block copolymers in the HMPSA according to the invention).

Examples of commercial products that may be mentioned include:
SBS: EUROPRENE® Sol T 166 (10% diblock and 30% styrene) from Polimeri Europa (Italy), STEREON® 840A from FIRESTONE® corporation (45% styrene) and KRATON® D1120 (75% diblock and 30% styrene);
linear SIS: VECTOR® 4411 from EXXONMOBIL® corporation having a 0% diblock content and a 44% styrene content, KRATON® D1113 from KRATON® (56% diblock and 16% styrene) and KRATON® D1165 (25% diblock and 30% styrene);
radial SIS: KRATON® D1124 (29% diblock and 30% styrene) and VECTOR® DPX 586 (80% diblock and 18% styrene) from EXXONMOBIL® corporation;
SIBS: KRATON® MD 6455 (35% diblock and 18% styrene); and
SEBS: KRATON® G1726 (70% diblock and 30% styrene) and KRATON® G1924 (30% diblock and 13% styrene), this being an SEBS grafted with 1% maleic anhydride.

According to another preferred embodiment, a linear or radial SIS is used as styrene block copolymer for the HMPSA according to the invention.

The tackifying resin or resins that can be used in the HMPSA according to the invention have weight-average molecular weights $M_w$ of generally between 200 and 5000 Da and are chosen in particular from:
(i) natural or chemically modified colophony rosins, such as for example the colophony extracted from pine gum, and wood colophony extracted from tree roots, and their hydrogenated, dimerized or polymerized derivatives or those esterified by monoalcohols or polyols such as glycerol, pentaerythritol or neopentyl glycol;
(ii) resins obtained by the hydrogenation, polymerization or copolymerization (with an aromatic hydrocarbon) of mixtures of unsaturated aliphatic hydrocarbons having about 5, 9 or 10 carbon atoms derived from petroleum fractions;
(iii) terpene resins generally resulting from the polymerization of terpene hydrocarbons such as, for example, monoterpene (or pinene) in the presence of Friedel-Crafts catalysts, optionally modified by the action of phenols;
(iv) copolymers based on natural terpenes, for example styrene/terpene, α-methyl styrene/terpene and vinyltoluene/terpene.

The tackifying resins selected for inclusion in the HMPSA according to the invention are liquid at room temperature or have a softening temperature below 150° C.

The softening temperature (or point) is determined in accordance with the standardized ASTM E 28 test, the principle of which is as follows. A brass ring about 2 cm in diameter is filled with the resin to be tested in the melt state. After cooling to room temperature, the ring and the solid resin are placed horizontally in a thermostatted glycerol bath, the temperature of which may vary by 5° C. per minute. A steel ball about 9.5 mm in diameter is centred on the solid resin disc. The softening temperature is, during the rise in temperature of the bath at a rate of 5° C. per minute, the temperature at which the resin disc flows by an amount of 25.4 mm under the weight of the ball.

The tackifying resins are commercially available and among these that are liquid or have a softening temperature below 150° C. there may for example be mentioned the following products in the families below:

(i) Sylvalite® RE 100S (an ester of colophony and pentaerythritol, having a softening temperature of about 100° C.) and Sylvatac® RE 12 (colophony ester liquid at room temperature), these two products being available from Arizona Chemical and Dertoline® G2L (softening temperature of 87° C.) and Dertopoline® CG (softening temperature of 117° C.) from the French company DRT;

(ii) Escorez® 5600 available from ExxonMobil Chemicals, this being a hydrogenated dicyclopentadiene resin modified by an aromatic compound (having an $M_w$ of about 980 Da and a softening temperature of 100° C.); Escorez® 5615 having a similar structure (softening temperature of 115° C.); Escorez® 5400, also from Exxon Chemicals (softening temperature of 100° C.); Wingtack® 86 from Cray-Valley; and Regalite® RS100 from Eastman;

(iii) Dertophene® T from DRT (having a softening temperature of 95° C.); Sylvarez® TP95 from Arizona Chemical, which is a phenolic terpene resin with a softening temperature of 95° C. and an $M_w$ of about 1120 Da; and (iv) Sylvarez® ZT 105 LT from Arizona Chemical, which is a styrene/terpene copolymer with a softening point of 105° C.

The term "compatible tackifying resin" is understood to mean a tackifying resin which, when it is mixed in 50%/50% proportions with a block copolymer chosen from the group comprising SBS, SIS, SIBS, SEBS and SEPS copolymers, gives a substantially homogeneous blend.

Liquid tackifying resins or those having a softening temperature between 90 and 120° C. are preferred, such as, for example, Sylvatac® RE 12, Escorez® 5615, Sylvarez® ZT 105 LT or Sylvalite® RE 100S.

The tackifying resin content of the HMPSA according to the invention is advantageously between 40 and 55%.

The hot-melt pressure-sensitive adhesive composition according to the invention comprises 1 to 20% of the supramolecular polymer as defined above.

The expression "supramolecular polymer" denotes a chemical structure formed by the molecules of the same compound that are linked together by hydrogen bonds. This expression derives by analogy from the term "polymer" which is conventionally used to denote a chemical structure obtained by the formation of covalent chemical bonds between one (in the case of a homopolymer) or more (in the case of a copolymer) repeat units. By analogy, the compound constituting a supramolecular polymer is also denoted by the term "repeat unit".

The supramolecular polymer in the composition according to the invention may derive from one or more repeat units, the molecular weight of which may vary from 200 to 9000 g/mol, preferably 200 to 2000 g/mol.

The repeat units of the supramolecular polymer comprise at least one amide functional group and a radical deriving from the imidazolidone of UDETA. These groups (called associative groups) allow the formation of hydrogen bonds between the molecules corresponding to these repeat units, which results in these molecules being structured into supramolecular polymers.

Such a supramolecular polymer is described in international patent application WO 2008/029065 which simply mentions, among various uses, a use as an additive for hot-melt adhesives and pressure-sensitive adhesives.

It has now been found that the incorporation of said supramolecular polymer into the HMPSA according to the invention makes it possible, in the content range indicated, to obtain a hot-melt pressure-sensitive composition, the homogeneous character of which enables it to be stored without any drawback in the molten state in a tank (also called a melter) at a temperature ranging up to 160° C. for several hours and up to 1 or 2 days, prior to it being coated onto a printable support layer. Furthermore, the self-adhesive label that results from the corresponding multilayer system is suitable for labelling an article, especially a glass article, and enables the label to be easily and rapidly debonded during a step of immersing said article in a basic aqueous medium. During the latter step, the pressure-sensitive composition remains essentially fastened to the support layer of the label, without leaving any trace on the surface of the article. Thus, it does not dissolve or is not dispersed (or only in very slight proportions) in the aqueous compositions used in the recycling treatment. This avoids additional treatments to decontaminate the washing baths.

The supramolecular polymer in the HMPSA according to the invention is obtained by reacting the UDETA of formula (I) with the fatty acid composition as defined above.

The dimeric and trimeric fatty acids are obtained by high-temperature polymerization under pressure of unsaturated fatty acids, called "monomers", which comprise 6 to 22 carbon atoms, preferably 12 to 20 carbon atoms, and derive from plant or animal matter. Examples of such unsaturated fatty acids (monomers) that may be mentioned include $C_{18}$ acids having one or two double bonds (oleic acid or linoleic acid respectively) obtained from tall oil, which is a byproduct of the manufacture of paper pulp.

After polymerization of these unsaturated fatty acids, a technical mixture is obtained that contains on average 30-35% of monocarboxylic acids (monomeric acids) often isomerized in relation to the starting acids, 60-65% of dicarboxylic acids (dimeric acids) with twice the number of carbon atoms relative to the starting acids and 5-10% of tricarboxylic acids (trimeric acids) having three times the number of carbon atoms in relation to the starting acids. By purifying this mixture, the various commercial grades of monomeric, dimeric or trimeric acids that may exist in hydrogenated or nonhydrogenated form are obtained. Among these, mention may be made of the Pripol® range developed by Uniqema.

According to a more particularly preferred embodiment, the supramolecular polymer is obtained by reacting, in substantially stoichiometric quantities, the UDETA of formula (I) with a monomeric and/or dimeric and/or trimeric fatty acid composition resulting from the polymerization of predominantly $C_{18}$ unsaturated monomeric fatty acids, said composition comprising 0 to 10% of monomers and 90 to 100% of a mixture of dimers and trimers.

According to an even more preferred embodiment of the invention, the fatty acid composition with which the UDETA of formula (I) is reacted comprises 0 to 5% of monomers and 95 to 100% of a mixture of dimers and trimers.

Examples of such mixtures that may be mentioned include:
Pripol® 1017, a mixture of about 1-3% of monomeric fatty acids, 75-80% of dimers and 18-22% of trimers;
Pripol® 1040, a mixture of about 0-1% of monomeric fatty acids, 20-25% of dimers and 75-80% of trimers;
Pripol® 1013, a mixture of about 0-1% of monomeric fatty acids, 95-98% of dimers and 2-4% of trimers; and
Unidyme® 14 from Arizona Chemicals, a mixture of about 0-1% of monomeric fatty acids, 94-97% of dimers and 2-5% of trimers.

The supramolecular polymer obtained by reacting UDETA of formula (I) with Pripol® 1017 is denoted hereinafter by the term SUPRA (Pripol® 1017). The corresponding repeat unit has an average molecular weight of about 900 g/mol. The reader may refer for its preparation to the aforementioned international patent application WO 2008/029065 and especially to Example 8.

Likewise, the terms SUPRA (Pripol® 1040), SUPRA (Pripol® 1013) and SUPRA (Unidyme® 14) denote hereinbelow the supramolecular polymer obtained by reacting the UDETA of formula (I) with the corresponding fatty acid mixture.

According to another preferred embodiment of the invention, the supramolecular polymer content in the HMPSA is between 3 and 15%.

An amount of 0.1 to 2% of one or more stabilizers or antioxidants is also preferably included in the composition according to the invention. These compounds are introduced in order to protect the composition from any degradation resulting from a reaction with oxygen, which is liable to occur through the action of heat, light or residual catalysts on certain raw materials such as the tackifying resins. These compounds may include primary antioxidants which trap free radicals and are generally substituted phenols, such as Irganox® 1010 from CIBA. The primary antioxidants may be used by themselves or in combination with other antioxidants, such as phosphites like Irgafos® 168, also from CIBA, or else with UV stabilizers such as amines.

The composition according to the invention may also include up to 20% of a plasticizer. This plasticizer may be a paraffinic or naphthenic oil which may contain a fraction of aromatic compounds (such as Nyflex® 222B from Nynas) or may contain no such fraction (such as Primol® 352 from ESSO).

The composition according to the invention may also include a wax of a polyethylene homopolymer (such as A-C® 617 from Honeywell) or else a wax of a polyethylene/vinyl acetate copolymer, or else pigments, dyes or fillers.

The hot-melt pressure-sensitive composition according to the invention is prepared by simple mixing of its ingredients at a temperature between 130 and 200° C. until a homogeneous mixture is obtained. The mixing conditions required are well known to those skilled in the art.

Another subject of the present invention is a multilayer system comprising:
  an adhesive layer consisting of the hot-melt pressure-sensitive adhesive composition according to the invention;
  a printable support layer adjacent to said adhesive layer, consisting of paper or a polymer film having one or more layers; and
  a protective layer adjacent to said adhesive layer.
  It is preferable to use, as printable support layer:
  paper with a weight of between 60 and 110 g/m²; or
  a heat-shrinkable film made of PET or PVC (commercially available under the name Pentalabel® from Klöckner) or OPP; or else
  an OPP/PET bilayer film, the OPP layer of which is adjacent to the adhesive layer.

The thickness of the adhesive layer in the multilayer system corresponds to an amount of HMPSA generally of between 7 and 50 g/m², expressed per unit area of the support layer.

The HMPSA according to the invention is applied to said support layer in the melt state at a temperature ranging from 130° C. to 180° C. The application is carried out by known coating techniques such as, for example, lipped-nozzle coating (at a temperature of about 160 to 180° C.) or curtain coating (at a temperature of about 120 to 180° C.). The HMPSA is generally applied by a lipped nozzle onto the protective layer, the assembly then being laminated to the support layer (transfer coating). The application of the HMPSA by curtain coating may be carried out directly on the support layer, depending on the coating temperature.

The multilayer system obtained is in the form of a very long rectangle and is generally packaged by being wound up into the form of wide reels having a width of up to 2 m and a diameter of 1 m.

The invention also relates to a self-adhesive label that can be obtained by conversion of the multilayer system described above. The conversion process employed generally comprises:
  a step of printing onto the printable support layer; then
  a step of cutting the multilayer system so as to reduce the width thereof, and therefore to repackage it on a reel of smaller width; and then
  a step (termed "stripping") of obtaining a multilayer system, packaged on the reel of the preceding step, in which the unchanged protective layer is bonded just to the part of the printed support layer that corresponds to the shape and dimensions of the self-adhesive label designed for its final use. This step therefore consists in selectively cutting it and then stripping off the undesirable part of the support layer and of the adhesive layer, said part often being termed the "backbone of the label".

This multilayer system is employed on lines for packaging articles to be labelled, by means of automated systems that separate the self-adhesive labels from the protective layer and fasten them onto the articles to be labelled.

The subject of the invention is also an article coated with the self-adhesive label as defined above.

The labelled article is preferably a package or container made of glass or of a usual plastic material chosen from PET (polyethylene terephthalate), PVC (polyvinyl chloride), PE (polyethylene) and PP (polypropylene).

A glass bottle is more particularly preferred. The glass bottles in question may or may not have received during their manufacture a coating treatment intended for maintaining their mechanical properties over time and for protecting them from being scratched. Such a treatment leads, for example, to the deposition of a metal oxide layer onto the surface of the glass, said metal oxide layer optionally being covered with an additional layer of waxy nature.

Finally, the invention relates to a process for recycling a labelled article, which includes a step of debonding the label by immersion of the labelled article in a basic aqueous solution maintained at a temperature of between 60 and 100° C., characterized in that the labelled article is as defined above.

Advantageously, the debonding of the label by this process results in its complete separation from the article, without leaving any adhesive residue on the surface of said article and without the adhesive composition contaminating the basic aqueous washing solution. Within the context of industrial implementation of the process, there is as a result less pollution of the washing waters and the recycling process is more economic, in particular from the standpoint of the quantity of water consumed. The labels thus separated from the treated articles may be collected and removed from the washing bath by appropriate mechanical means.

The process according to the invention is preferably implemented at a temperature of about 80° C.

The adhesiveness of the HMPSA according to the invention is determined by the 180° C. peel test on a glass plate, as described in FINAT Test Method No. 1 published in the FINAT Technical Manual, 6th edition, 2001. FINAT is the International Federation for Self-adhesive Label Manufacturers and Converters. The principle of this test is as follows.

A heat-shrinkable PVC film 50 μm in thickness is precoated with the HMPSA in an amount of 20 g/m², which film, after immersion in water at 95° C. for 30 seconds, shrinks by about 72%.

A test specimen in the form of a rectangular strip (measuring 25 mm×175 mm) is cut from the self-adhesive support thus obtained. This specimen is fastened to a substrate consisting of a glass plate. The assembly obtained is left for one hour at room temperature and is then introduced into a tensile testing machine capable of peeling or debonding the strip at an angle of 180° and with a separation rate of 300 mm per minute. The machine measures the force required to debond the strip under these conditions. The result is expressed in N/cm. The 180° C. peel strength, when bonded to a glass plate, of the adhesives intended for manufacturing self-adhesive labels is generally greater than 2 N/cm, preferably greater than 4 N/cm.

The tack of the HMPSA according to the invention is determined by the loop tack test described in FINAT Test Method No. 9. The same film as that for the peel test is coated beforehand with the HMPSA in an amount of 20 g/m² so as to obtain a rectangular strip measuring 25 mm by 175 mm. The two ends of this strip are joined together to form a loop, the adhesive layer of which is facing outward. The two joined ends are placed in the movable jaw of a tensile testing machine capable of imposing a rate of displacement of 300 mm/minute along a vertical axis, with the possibility of forming a forward-and-back movement. The lower part of the loop placed in the vertical position is firstly put into contact with a horizontal glass plate measuring 25 mm by 30 mm over a square area measuring about 25 mm per side. Once this contact has occurred, the displacement direction of the jaw is reversed. The tack is the maximum value of the force needed for the loop to be completely debonded from the plate. The tack of a PSA is generally equal to or greater than 1 N/cm².

The hot debondability in basic aqueous medium of labels coated with the HMPSA according to the invention, fastened beforehand to a glass substrate, is determined by the following test.

Glass bottles 7 cm in diameter and about 20 cm in height are used, these being divided into two groups depending on the nature of the constituent glass. This is because the glass has two types of surface layer, depending on the coating treatment applied during manufacture of the bottles. The 1st type of layer essentially comprises tin oxide. The 2nd type essentially comprises an oxidized polyethylene wax emulsion applied to a tin oxide layer. The 2nd type of layer is characteristic of new glass bottles. The 1st type is characteristic of glass bottles that have already been immersed in a basic aqueous solution, during at least one cleaning cycle. The 1st group of bottles is denoted hereafter by "SnO" and the 2nd by the abbreviation "PE".

The same support layer is coated with the HMPSA to be tested, the coating conditions being the same as in the 180° peel test. Rectangular (7 cm×5 cm) labels are cut from the self-adhesive support thus obtained.

Four glass bottles, two of PE type and two of SnO type, were each coated with one of these labels, fixed by simple pressure. Next, before continuing the test, and for each group of labelled PE and SnO bottles:

one of the two labelled bottles was simply left for 48 hours at room temperature; and
  the other labelled bottle was left for 24 hours at room temperature and then placed for 24 hours in an oven at 50° C. with a relative humidity of less than 25% and then for a further two hours at room temperature.

The aim of these two environmental treatments was to simulate the behaviour of a labelled bottle at the initial stage (at the moment of labelling it) and after ageing (i.e. at a subsequent stage in its life cycle after commercialization), respectively.

The test was then continued by immersing each labelled bottle in a thermostatted water bath at 80° C. with a pH of 12 and by measuring, after this immersion, the time taken for the label to be completely debonded from the bottle.

The following examples are given purely by way of illustration of the invention and should not be interpreted in such a way as to limit the scope thereof.

The compositions given in Table 1 below were prepared by simple hot-mixing at 180° C. of the ingredients indicated. Apart from these ingredients, said compositions generally contained 1% of stabilizers or antioxidants.

The results of the tests carried out are indicated in Table 2.

During the implementation of the hot debonding test in an aqueous basic medium, after separation of the label no adhesive residue was observed on the surface of the bottles. The loss of HMPSA of the label was about 0%, thereby indicating, for each of these examples, that the basic aqueous washing solution does not contain HMPSA.

TABLE 1

(contents in %)

| Ingredient | Reference | Ex. 1 | Ex. 2 | Ex. 3 | Ex. 4 | Ex. 5 |
|---|---|---|---|---|---|---|
| Kraton ® D1124 (29% diblock and 30% styrene) | 41 | 40 | — | 40 | 40 | 40 |
| Kraton ® D1165 (25% diblock and 30% styrene) | — | — | 40 | — | — | — |
| Sylvarez ® ZT 105 LT (styrene/terpene copolymer with a softening point of 105° C.) | 19 | 16 | 20 | 16 | 16 | 16 |
| Escorez ® 5615 (liquid tackifying resin) | 20 | 16 | 20 | 16 | 16 | 16 |
| Sylvalite ® RE 100S (liquid tackifying resin) | — | — | 5 | — | — | — |
| Sylvatac ® RE 12 (liquid tackifying resin) | 14 | 13 | — | 13 | 13 | 13 |
| SUPRA (Pripol ® 1017) (mixture of about 1-3% monomeric fatty acids, 75-80% dimers and 18-22% trimers) | — | 10 | 6 | — | — | — |
| SUPRA (Pripol ® 1040) (mixture of about 0-1% monomeric fatty acids, 20-25% dimers and 75-80% trimers) | — | — | — | 10 | — | — |
| SUPRA (Pripol ® 1013) (mixture of about 0-1% monomeric fatty acids, 95-98% dimers and 2-4% trimers) | — | — | — | — | 10 | — |
| SUPRA (Unidyme ® 14) (mixture of about 0-1% monomeric fatty acids, 94-97% dimers and 2-5% trimers) | — | — | — | — | — | 10 |
| Primol ® 352 (plasticizer) | 5 | 4 | 8 | 4 | 4 | 4 |

TABLE 2

| Test | Reference | Example 1 | Example 2 | Example 3 | Example 4 | Example 5 |
|---|---|---|---|---|---|---|
| 180° peel on glass (N/cm) | 4 | 6.2 | 6.4 | 6 | 5.8 | 5.7 |
| Loop tack (N/cm$^2$) | 4 | 3.5 | 4.1 | 3.2 | 3 | 3.4 |
| Time to debond a label on a bottle of SnO type in the initial stage (in s) | 30 | 19 | 15 | 14 | 11 | 8 |
| Time to debond a label on a bottle of SnO type after ageing (in s) | >180 | 25 | 21 | 20 | 17 | 29 |
| Time to debond a label on a bottle of PE type in the initial stage (in s) | >180 | 15 | 11 | 25 | 15 | 13 |
| Time to debond a label on a bottle of PE type after ageing (in s) | >180 | 28 | 20 | 36 | 20 | 22 |

The invention claimed is:

1. A hot-melt pressure-sensitive adhesive (HMPSA) composition comprising:
    a) 25 to 50% by weight of one or more styrene block copolymers chosen from polystyrene-polybutadiene-polystyrene (SBS), polystyrene-polyisoprene-polystyrene(SIS), polystyrene-polyisoprene-polybutadienepolystyrene(SIBS), polystyrene-poly(ethylenebutylene)-polystyrene (SEBS), or polystyrene-poly(ethylenepropylene)-polystyrene (SEPS);
    b) 35 to 72% by weight of one or more compatible tackifying resins which are liquid or have a softening temperature below 150° C.; and
    c) 3 to 20% by weight of one or more supramolecular polymers obtained by reaction between:
        1-(2-aminoethyl)-2-imidazolidone (also called Ureido DiEthylene TriAmine or UDETA):

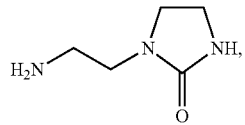

Formula (I)

and
        a fatty acid composition comprising:
            51 to 100% by weight of one or more dimers and/or trimers of identical or different fatty acids; and
            0 to 49% by weight of one or more monomers of identical or different fatty acids.

2. The HMPSA of claim 1, wherein the content of the one or more styrene block copolymer is 30 to 50% by weight.

3. The HMPSA of claim 1, wherein the one or more styrene block copolymer is a linear or radial polystyrene-polyisoprene-polystyrene(SIS).

4. The HMPSA of claim 1, wherein the tackifying resin is liquid or has a softening temperature between 90 and 120° C.

5. The HMPSA of claim 1, wherein the tackifying resin content is between 40 and 55% by weight.

6. The HMPSA of claim 1, wherein the supramolecular polymer is obtained by reaction, in stoichiometric quantities, of UDETA of formula (I) with a monomeric, dimeric, and/or trimeric fatty acid composition resulting from the polymerization of $C_{18}$ unsaturated monomeric fatty acids, wherein said fatty acid composition comprises 0 to 10% by weight of monomers and 90 to 100% by weight of a mixture of dimers and trimers.

7. The HMPSA of claim 1, wherein the fatty acid composition with which the UDETA of formula (I) is reacted comprises 0 to 5% by weight of monomers and 95 to 100% by weight of a mixture of dimers and trimers.

8. The HMPSA of claim 1, wherein the supramolecular polymer content is between 3 and 15% by weight.

9. The HMPSA of claim 1, wherein the HMPSA further comprises 0.1 to 2% by weight of one or more stabilizers or antioxidants.

10. A multilayer system comprising:
    an adhesive layer consisting of the HMPSA of claim 1;
    a printable support layer adjacent to said adhesive layer, consisting of paper or a polymer film having one or more layers; and
    a protective layer adjacent to said adhesive layer.

11. The multilayer system of claim 10, wherein the multilayer system uses, as printable support layer:
    paper with a weight of between 60 and 110 g/m$^2$;
    a heat-shrinkable film made of polyethylene terephthalate (PET), polyvinyl chloride (PVC), or oriented polypropylene (OPP); or
    an OPP/PET bilayer film, wherein the OPP layer is adjacent to the adhesive layer.

12. The multilayer system of claim 10, wherein the thickness of the adhesive layer corresponds to an amount of HMPSA between 7 and 50 g/m$^2$, expressed per unit area of the support layer.

13. A self adhesive label comprising the multilayer system of claim 10.

14. An article labelled with the self-adhesive label of claim 13.

15. The article of claim 14, consisting of a package or container made of glass or a plastic, wherein the package or container is labelled with the self-adhesive label.

16. The article of claim 15, wherein the package or container is made of a glass bottle.

* * * * *